Saml. Wetherill's Process of Manufacturing White Oxide of Zinc

No. 73,147

Patented Jan. 7, 1868

Fig. 3. Sec. at xx

Fig. 5. Sec. at zz

Fig. 4. Sec. at yy

Witnesses:
G. Peck
A. DeLacy

Inventor:
Saml. Wetherill
By atty
John Sutor

United States Patent Office.

SAMUEL WETHERILL, OF PHILADELPHIA, PENNSYLVANIA.

*Letters Patent No. 73,147, dated January 7, 1868.*

---

IMPROVED APPARATUS FOR THE MANUFACTURE OF WHITE OXIDE OF ZINC.

---

*The Schedule referred to in these Letters Patent and making part of the same.*

---

TO ALL WHOM IT MAY CONCERN:

Be it known that I, SAMUEL WETHERILL, of Philadelphia, of Philadelphia county, in the State of Pennsylvania, have invented certain new and useful Improvements in Apparatus for the Manufacture of White Oxide of Zinc; and I do hereby declare that the following is a full and exact description thereof, reference being had to the accompanying drawings, making part of this application.

My present invention relates to certain new and useful improvements in apparatus for conducting a process of manufacture of white oxide of zinc, invented by me, and described fully in another application for Letters Patent, filed simultaneously with this. My new process is described as consisting mainly in carrying the products of combustion, where bituminous coke or charcoal is used in the furnace with the ore, into and through incandescent carbon, and thence into a hot blast; and the invention made the subject-matter of this application consists in the employment, in combination with the furnace in which the ore and fuel are placed, of one or more chambers communicating with said furnace, provided with apertures at its bottom, (or their bottoms,) and adapted to receive and contain incandescent coal, through which the products of combustion are to pass, as will be hereinafter more fully explained; and my invention further consists in the employment, in combination with the incandescent chamber or chambers and the furnace, of hot-blast flues, and a suitable means for supplying the hot blast, as will be presently fully explained; and my invention further consists in the arrangement of air-tubes or pipes immediately over the furnace, and in communication, at their ends, with the hot-blast chambers, as will be presently more fully explained, whereby the waste heat from the exterior of the furnace is utilized to heat the air employed in the process.

To enable those skilled in the art to make and use my invention, I will proceed to more particularly describe the construction and operation of my improved apparatus for the manufacture of white oxide of zinc, referring by letters to the accompanying drawings, in which—

Figure 3 is a vertical section at the line $x\ x$.

Figure 4 is a vertical section at the line $y\ y$; and

Figure 5 is a vertical section at the line $z\ z$.

In the several figures, I have designated the same parts by the same letters of reference.

Figure 2:
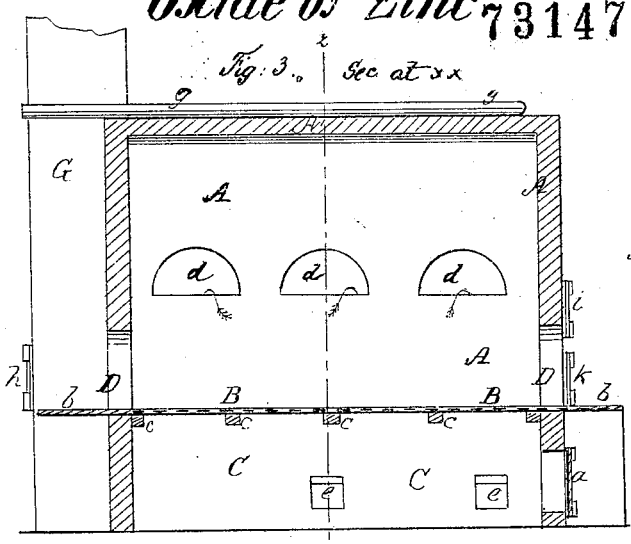
Figure 2 is a front elevation of a furnace for conducting my new process, and which is similar to the furnace employed by me under my formerly-patented process, but with the addition of two auxiliary furnaces and a hot blast, as will be presently explained.
Figure 2:
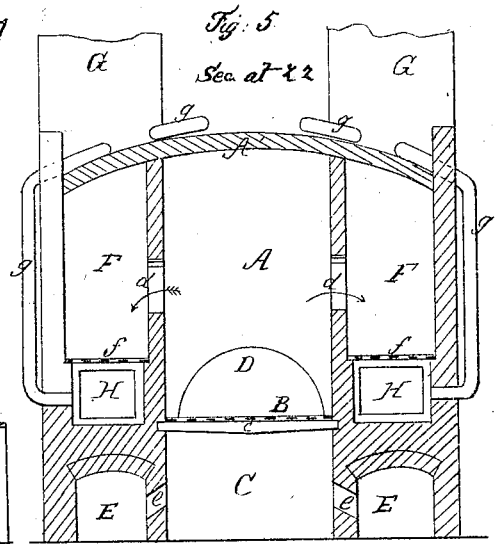
Figure 2:
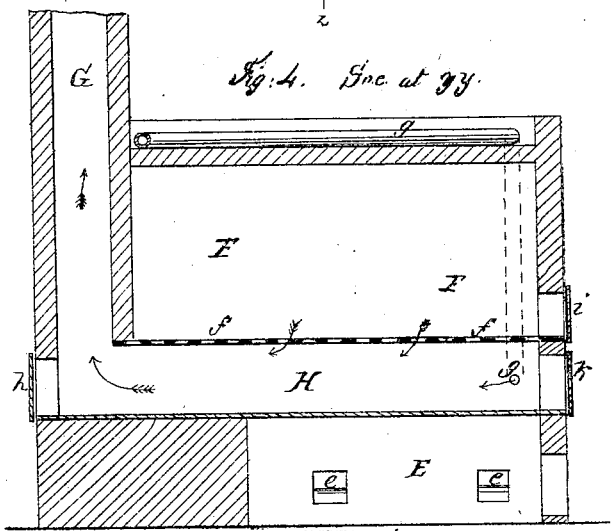
Figure 2:
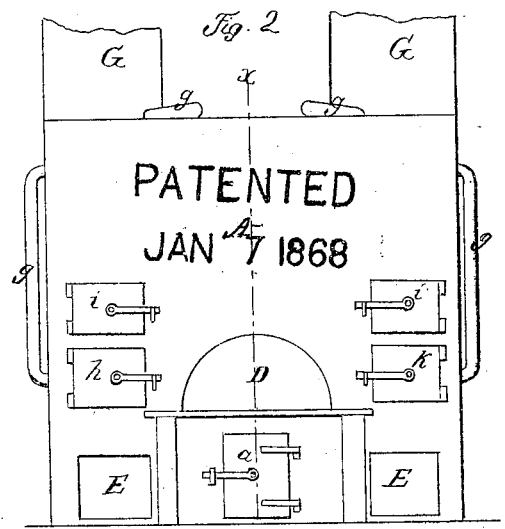
Figure 1:
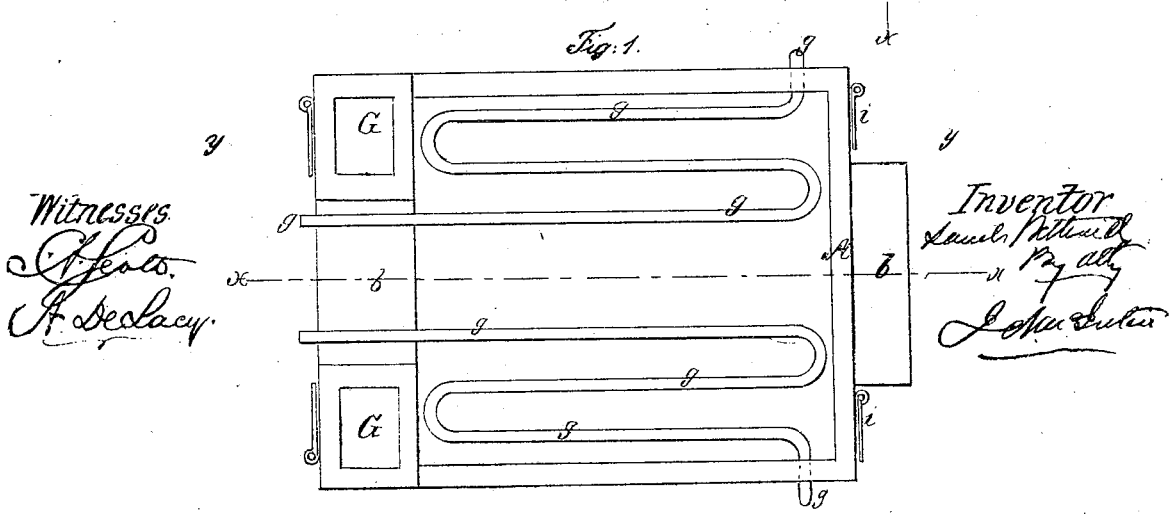
Figure 1 is a top view.

A is the main furnace-chamber, and B the grate-bars or perforated bed of the furnace. C is its ash-pit, and D the openings through which the furnace is charged. E E are the cold-blast flues, and $e\ e$ the passages leading from them to supply the cold blast to the furnace. This much of the apparatus or structure is about similar to that heretofore employed in carrying out the process or method of manufacture described in my previous patent.

On each side of the furnace A is arranged a chamber, F F, beneath which is a conduit or passage, H H. These chambers F F are completely covered by the crown-arch A' of the furnace, and communicate with the chamber A only by means of ports or openings, $d\ d\ d$; and the bottoms of said chambers are formed of perforated tile, $f\ f$, the apertures of which tile constitute numerous passages of communication between said chambers F F and the oxide-flues or passages H H, for purposes to be presently explained. G G are the flues through which the products of combustion are carried off to the separating and catching-apparatus, and $g\ g$ are air-tubes, to which a supply of air is fed, and in which the air is heated, and from which the hot blast is supplied to the passages H H, as will be presently explained. The flues H H and chambers F F have doors, $i\ i$ and $k\ k$, through which access may be had to said flues and chambers when desired. $a$ is the door of the ash-pit.

Having so far alluded in detail to the several parts of the apparatus employed, I will now describe the operation of the apparatus as practised in conducting my new process.

A fire of small coke having been thoroughly ignited upon the perforated iron plate or grate B of the centre or main furnace A, and the auxiliary furnaces or chambers F F having been supplied with beds of incandescent coals of coke or charcoal about up to the level of the lower sides of the ports $d\ d\ d$, the charge of ore and coke is put into the furnace A through the charging-openings D, which are stopped by a mass of the charging-materials. Of course the ore is previously crushed by any of the known means, and mixed with an equal bulk of wetted coke, or with a larger bulk of wetted charcoal, in the manner well known to those conversant with the art. When the furnace shall have been thus charged, the chambers F F filled with incandescent coals, and the fire thoroughly going, so that the zinc vapors arise, the hot blast is turned on to the oxide-flues H H, (the hot blast being supplied from the tubes $g\ g$, which are so arranged, as shown, on the crown-arch of the furnace that a supply of cold air fed or forced into their upper ends becomes heated before it escapes from their lower ends into the chambers H H.) The products of combustion, having no other source of escape, are compelled to pass through the ports $d\ d\ d$, and thence down, through the masses of incandescent coals, (in chambers F F,) and through the perforated tiles $f\ f$, into the oxide-flues H H, where they come into contact with and are carried off to the flues G G by the hot blast; and, by being thus drawn through the incandescent carbon-chambers and hot-blast flues, the zinc vapor is reoxidized, and all the undecomposed speculæ of carbon which may have passed through the incandescent coals are consumed.

After all the zinc shall have been expelled in the operation just explained, a damper may be closed (or inserted) at the termination of the oxide-flues, the old charge, if necessary, taken out, a fresh bed of small coke introduced and well ignited, and a new charge put in, and the operation repeated or continued, (the incandescent chambers being always kept supplied with fresh coals.)

Having fully explained the construction and operation of my improved apparatus, what I claim as new, and desire to secure by Letters Patent, is—

The combination, with the furnace, of one or more chambers, communicating with said furnace, and adapted to contain incandescent coals, and permit the passage of the products of combustion from the furnace through the said coals, substantially as and for the purposes described.

I also claim, in combination with the incandescent chambers, hot-air flues, into which the vapors of zinc may pass from said chambers, to mingle with and be carried off by a hot blast, substantially as described, for the purposes set forth.

I also claim the arrangement of the blast-tubes $g$ immediately over the furnace, and communicating with the chambers E E, as and for the purposes described.

In testimony whereof, I have hereunto set my hand and seal, this twenty-third day of October, 1867.

SAMUEL WETHERILL. [L. S.]

Witnesses:
W. C. WETHERILL,
S. P. WETHERILL.